United States Patent [19]

Pos

[11] 4,054,787
[45] Oct. 18, 1977

[54] APPARATUS FOR COMPUTING AN ARITHMETICALLY ACCUMULATED SEQUENCE OF NUMBERS

[75] Inventor: Norman D. Pos, Imperial Beach, Calif.

[73] Assignee: The United States of America as represented by the Secretary of the Navy, Washington, D.C.

[21] Appl. No.: 584,679

[22] Filed: June 6, 1975

[51] Int. Cl.² .............................................. G06F 7/50
[52] U.S. Cl. .................................................. 364/748
[58] Field of Search ............... 235/168, 152, 156, 159, 235/164; 340/172.5, 173 AM; 441/1

[56] References Cited

U.S. PATENT DOCUMENTS

| | | | |
|---|---|---|---|
| 3,037,701 | 6/1962 | Sierra | 235/159 |
| 3,043,509 | 7/1962 | Brown et al. | 235/156 |
| 3,244,864 | 4/1966 | Jones | 235/168 |
| 3,564,227 | 2/1971 | Bowers | 235/168 |
| 3,829,673 | 8/1974 | Bouton, Jr. et al. | 235/164 |
| 3,863,058 | 1/1975 | Savit | 235/168 |

*Primary Examiner*—Malcolm A. Morrison
*Assistant Examiner*—Errol A. Krass

*Attorney, Agent, or Firm*—Richard S. Sciascia; Ervin F. Johnston; John Stan

[57] ABSTRACT

Apparatus for computing an arithmetically accumulated sequence of exponent-mantissa formatted numbers, which comprises write-in apparatus and read-out apparatus. The write-in apparatus comprises means for separating each of a sequence of numbers in exponent-mantissa form according to the values of the exponent, the value of the exponent being employed as a storing address for the number. Means connected to the separating means algebraically sum mantissas of like exponents; the two above means comprising a write logic block. A random-access memory is connected to the summing means for storing the sum of the mantissas. It also includes means for addressing the storing means. Means are connected between the storing means and the summing means for writing the last stored quantity back into the summing means, so that it may be summed algebraically to the latest incoming mantissa from the sequence of numbers, the new sum then being written back into that part of the random-access memory with the same, like, exponent address. The read-out apparatus is similar to the write-in apparatus.

6 Claims, 3 Drawing Figures

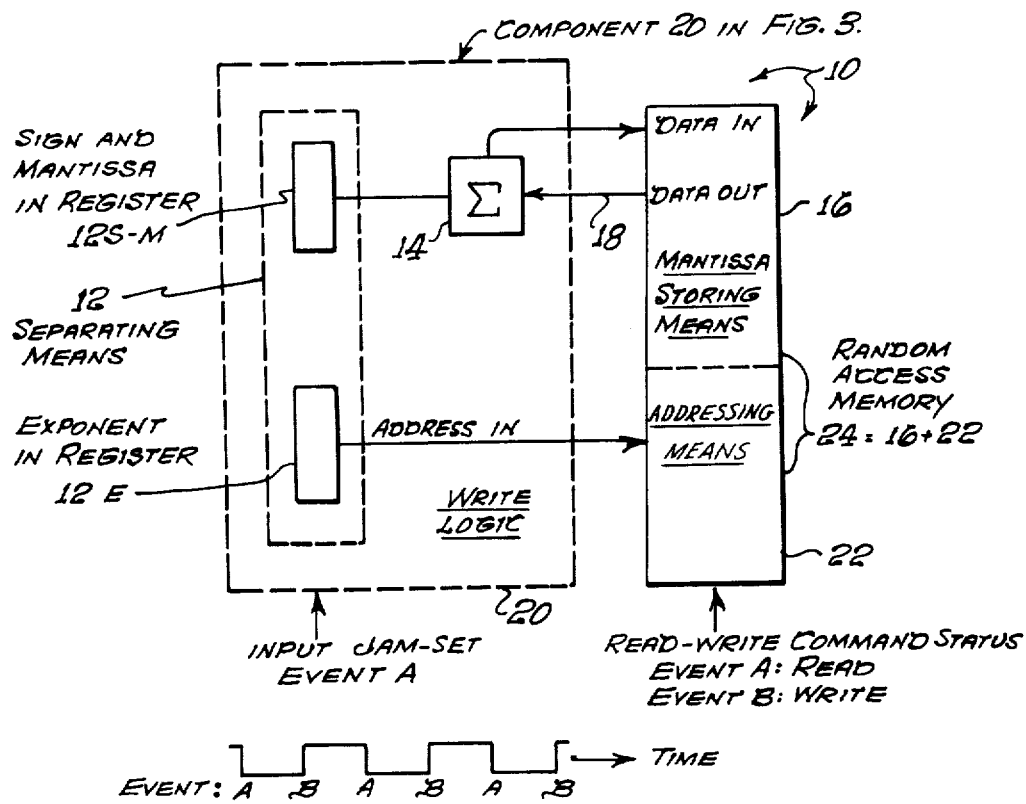
FIG. 1. WRITE CYCLE OF COMPUTING APPARATUS.

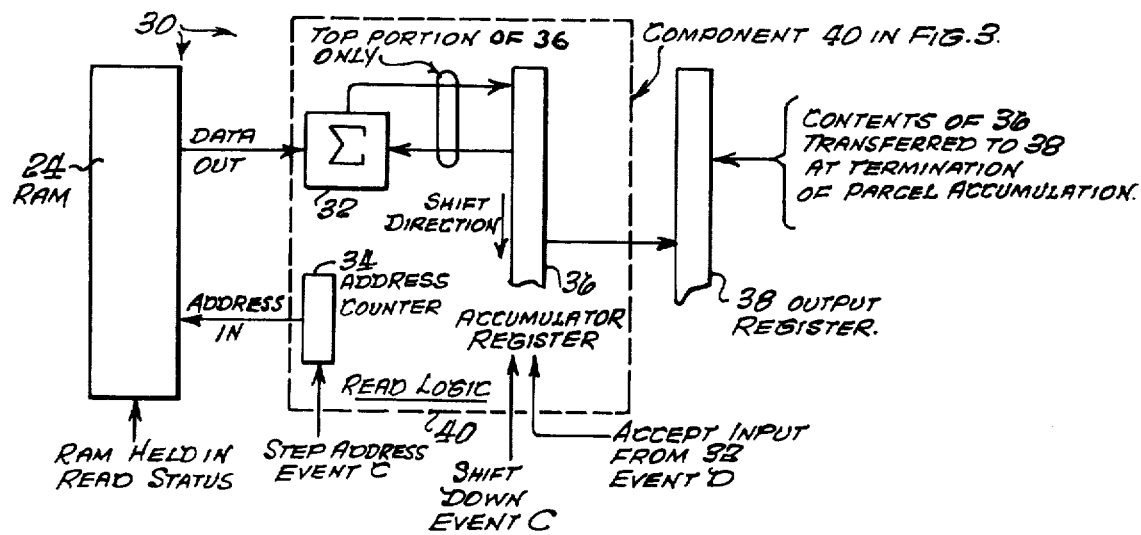
FIG. 2. READ CYCLE OF COMPUTING APPARATUS.
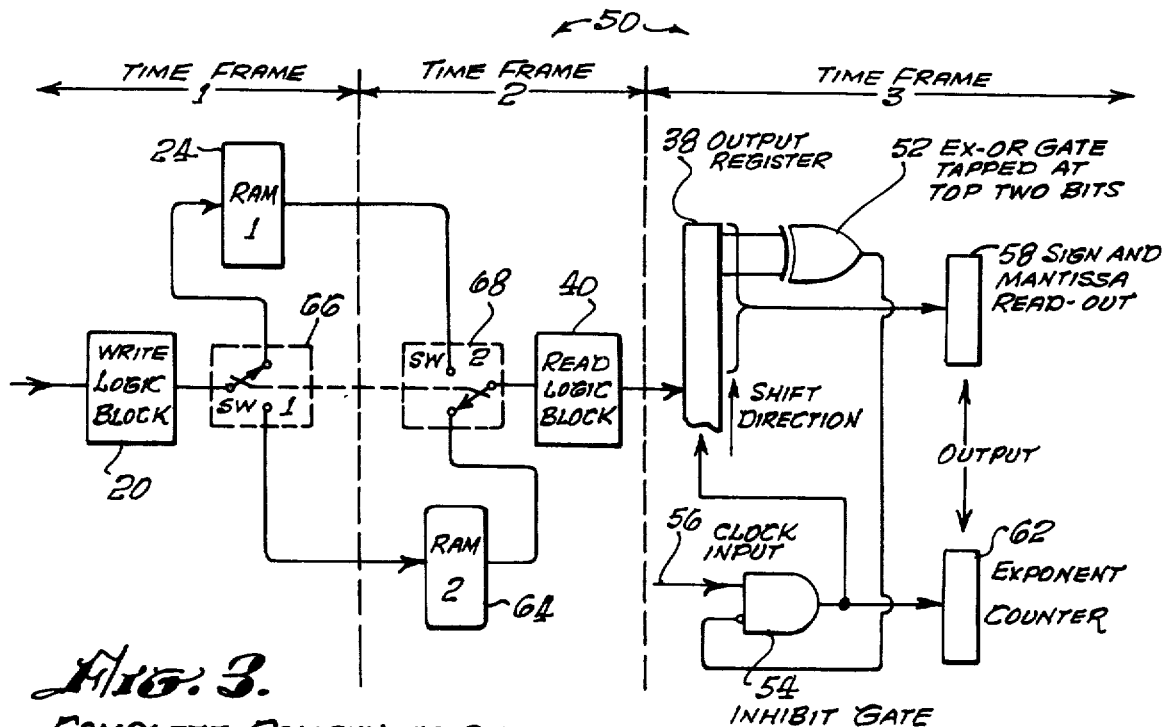
FIG. 3. COMPLETE COMPUTING SYSTEM

APPARATUS FOR COMPUTING AN ARITHMETICALLY ACCUMULATED SEQUENCE OF NUMBERS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

In computers with floating-point arithmetic operations a number is memorized in a word composed of two parts: a mantissa, which contains the significant figures of the number and an exponent. Words so formatted are said to be in "exponent-mantissa" form. For example, a computer that has a 45-bit word may use 36 bits for the significant figures and their sign and nine bits for the exponent and its sign. Hence this computer can handle numbers whose absolute values are as large as $(2^{35} \times 1) \times 2^{255}$ (since $2^8 = 256$) or as small as $2^{-255}$, that is, numbers within this range with no more than 35 significant bits. A range such as this covers most cases that usually occur, and hence relieves the coder of all scaling considerations.

This invention relates to apparatus which reduces the time required to compute accumulated algebraic sums of numbers when the numbers are formatted in an exponent-mantissa form. This invention allows such arithmetic processes to take place at a rate comparable to that for similar processes performed upon ordinary magnitude-formatted numbers of similar precision, that is, of the same significant digit length.

In the design of digital computing apparatus, dynamic range is usually obtained by formatting the numerical information in the form of exponent-mantissa. The range of exponent which the apparatus can accommodate determines the dynamic range which the apparatus can handle, while the size of the mantissa determines the precision of the arithmetic.

One consequent problem of this number format is that the addition-subtraction process is complicated by the (in general) inequality of the exponents of the numbers to be combined. Valid addition or subtraction of such numbers requires that their exponents be matched prior to the arithmetic process. This is a time-consuming process.

This problem is of particular concern when the arithmetic process is required to take place in real time. This requirement is typical of signal-processing apparatus intended for use in such areas as sonar target ranging and sonar signal enhancement and correlation.

When a lengthy sequence of numbers is to be algebraically combined in the manner described above, the process is called "accumulating". The conventional methods of exponent-adjusting between each accumulation step occupy intolerable spans of computation time. In state-of-the-art equipment design, these facts press hard against the reliable speed limits of digital devices, and constitute a barrier to full signal processing effectiveness.

The invention herein disclosed relates to a method of instrumenting the process of algebraically accumulating a sequence of numbers of exponent-mantissa format. The method is novel, and effects a large reduction in the requisite computation time.

The apparatus of this invention allows the computation of algebraic accumulations of numbers formatted in the exponent-mantissa form to proceed at a rate comparable to that for ordinary numbers. When an apparatus is constructed to handle a large dynamic range of data, which implies a wide spread of expectable exponents, the method described in this disclosure provides for a very significant reduction in machine computation time.

The salient new feature of this invention is the use of the exponent of the incoming number as an automatic sorting device in the form of a random access memory (RAM) address for that number. The necessity of pre-adjusting the exponents of a string of numbers prior to algebraic accumulation is thereby eliminated, greatly increasing the potential computation rate.

SUMMARY OF THE INVENTION

This invention relates to apparatus for computing an arithmetically accumulated sequence of exponent-mantissa formatted numbers which does not require the time consuming process of exponent adjusting between each accumulation step, the computing apparatus comprising write-in apparatus and read-out apparatus. The write-in apparatus comprises:

Means are provided for separating each of a sequence of binary numbers in exponent-mantissa form according to the values of the exponent, the value of the exponent being employed as a storing address for the number. Means connected to the separating means algebraically sum mantissas of like exponents; the two above means comprising a write logic block.

A random-access memory is connected to the summing means for storing the sum of the mantissas. It also includes means for addressing the storing means.

Means are provided for connecting the mantissa storing means, and the summing means which enables writing the last stored quantity back into the summing means, so that it may be summed algebraically to the latest incoming mantissa of the exponent from the sequence of numbers, the new sum of the mantissas then being written back into that part of the random-access memory having the same, like, exponent address.

The read-out apparatus of the computing apparatus is similar to the write-in apparatus. It includes an output register, connected to the accumulator register of the read logic block, whose contents are shifted up, leaving the most significant bit unchanged, until the two next most significant digits disagree. An exclusive-or gate, which is connected to the output of the output register, determines when the two most significant digits disagree.

An inhibit gate, having as inputs a clock input and the output of the exclusive-or gate, is inhibited when the two most significant digits disagree, thereby terminating the reformatting process, the most significant bits in the outer register designating the sign and mantissa of the accumulated data and the exponent counter designating the exponent of the accumulated data.

STATEMENTS OF THE OBJECTS OF THE INVENTION

An object of the invention is to provide computing apparatus which reduces the amount of time required to perform certain computer operations.

Another object of the invention is to provide computing apparatus which does not require the complex method of exponent-adjusting between each accumulation step.

BRIEF DESCRIPTION OF THE DRAWINGS

FIG. 1 is a block diagram of the write cycle of the computing apparatus of this invention.

FIG. 2 is a block diagram of the read cycle of the computing apparatus.

FIG. 3 is a block diagram of the complete computing apparatus of this invention.

DESCRIPTION OF THE PREFERRED EMBODIMENTS

Referring now to FIG. 1, this figure illustrates part of an apparatus 10 for computing an arithmetically accumulated sequence of exponent-mantissa formatted numbers, which does not require the time-consuming process of exponent adjusting between each accumulation step. The computing apparatus comprises write-in apparatus 10, shown in FIG. 1, and read-out apparatus (30, shown in FIG. 2), the write-in apparatus comprising means 12 for separating each of a sequence of binary numbers in exponent-mantissa form according to the values of the exponent, the value of the exponent being employed as a storing address for the number. The separating means may comprise a set of wires which feed the binary digits into the computing apparatus 10 in a parallel manner.

Means 14 are connected to the separating means 12 for algebraically summing mantissas of like exponents. The two above means, 12 and 14, comprise a write logic block 20.

First means 16 are connected to the summing means 14 for storing the sum of the mantissas. Means 18 are provided for connecting the mantissa storing means 16 and the summing means 14 for feeding, or writing, the last stored quantity back into the summing means, so that it may be summed algebraically to the latest incoming mantissa from the sequence of numbers, from the sign and mantissa of like exponent register 12S-M.

A means 22, connected to the separating means 12, is provided for addressing the storing means 16. The new algebraic sum is written back into that part of the storing means 16 having the same, like, exponent address. In the write-in apparatus 10 the storing means and the addressing means, 16 and 22, would generally comprise a random-access memory (RAM) 24.

The complete apparatus for computing an arithmetically accumulated sequence of exponent-mantissa formatted numbers also requires read-out apparatus 30, as shown in FIG. 2. The apparatus 30 includes a second summing means 32, connected to the random-access memory 24, which, starting with the least significant data in the RAM, reads out the data in the RAM.

An address counter 34, connected to the random-access memory 24, sequentially steps the read addresses stored in the RAM. An accumulator register 36, connected to the second summing means 32, reads out the data in the second summing means, starting with the least significant data, and writes it back into the second summing means, where it is accumulated to the next least significant data, the reading out and writing in, that is, the accumulating, continuing until all the data in the random-access memory 24 is read out. The combination of second summing means 32, address counter, and accumulator register 36, comprise a read logic block 40. The computing apparatus 30 may further comprise an output register 38, connected to the accumulator register 36 of the read logic block 40, which reads out the totally accumulated data in the accumulator register, the data now being in absolute form, having a pure magnitude in binary form and having lost its explicit exponent.

As is shown in FIG. 3, the computing apparatus 50, shown therein, may further comprise apparatus for reconstituting the data formatted as a pure magnitude. The apparatus 50 includes the output register 38, connected to the accumulator register 36 of the read logic block 40, whose contents are shifted up, leaving the most significant bit, the sign bit, unchanged, until the two most significant digits representing the mantissa disagree. An exclusive-or gate 52, which is connected to the output of the output register 38, determines when the two most significant digits representing the mantissa disagree.

An inhibit gate 54, having as inputs a clock input 56 and the output of the exclusive-or gate 52, which inhibit gate is inhibited by the exclusive-or gate 52 when the two most significant digits disagree, thereby terminating the reformatting process. The most significant bits in the sign and mantissa readout 58 designate the sign and mantissa of the accumulated data while the exponent counter 62 designates the exponent of the accumulated data.

As is shown in FIG. 3, the computing apparatus 50 may further comprise another random-access memory 64, substantially identical to the first-named RAM 24.

A first switching means 66, connected to the write logic block 20, transfers data selectively from the write logic block to the first or second-named random-access memory, 24 or 64. A second switching means 68 is connected to the read logic block 40 and selectively to the second-named or first-named random-access memory, 64 or 24, so that as data is written into one random-access memory, 24 or 64, from the write logic block 20, it may be read out of the other random-access memory, 64 or 24, by the read logic block.

BRIEF DESCRIPTION OF THE OPERATION OF THE COMPUTING APPARATUS

The problem of rapid algebraic summing in real time of a flow of numbers which have a distribution of various exponents is handled in this invention by a three-step process:

Time Frame 1 (See FIGS. 1 and 3):

The incoming data having sign and mantissa and exponent, is sorted according to exponent, in RAM 24. Each sort "bin" in RAM 24 accomplishes algebraic addition with numbers of like exponent.

The general idea of this invention is the use of the exponent, which enters the write logic circuit 20 in register 12E, as an address in a random access memory 24.

By this means, each addition step, accomplished in the summer 14, occupies no more time than would be required for the simple addition of ordinary "exponentless" numbers.

Time Frame 2 (See FIGS. 2 and 3):

The desired parcel of real-time numbers have been sorted according to exponent, and each sorted "bin"

within the RAM 24 contains the sum of all numbers with exponent equal to the bin address. Since the exponent was used as the RAM address, it follows that the address-sequential contents of the RAM 24 are also in number-magnitude sequence.

Therefore, the contents of the RAM 24 need only be read out in address sequence. Starting with the least significant data in address No. 0, the RAM 24 is sequentially readout into an adder 32 whose other input is the top end of a long accumulating shift register 36. The next least significant data, in address No. 1, is sequentially read out into adder 32 and summed with the data accumulated in accumulator register 36, which at this point would only include the data from address No. 0. The sum of the data within addresses No. 0 and No. 1 is stored in the accumulator register 36, to be next added to the data stored in address No. 3 in the RAM 24. The sequential stepping of the read address is done by address counter 34. In between these addition steps, the accumulating shift register 36 is shifted down one step. This scheme automatically accounts for the proper recombining of RAM contents, which will (frequently) individually exceed the incoming mantissas in length.

At the termination of the accumulation of the desired parcel of incoming data, the contents of the accumulating shift register are jam-set into the output register 38, freeing the accumulator 36 for use with the next parcel of data. The term "jam-set" implies parallel loading.

Time Frame 3 (See FIG. 3):

At this point in the process, the totally accumulated number exists in the output register 38. It is in "absolute" form, being pure magnitude in binary form, and has lost its explicit exponent.

If it is desired to have the same exponent-mantissa format of the accumated sum reconstituted at the output, as existed on the input, then this third time frame is necessary. Two's complement arithmetic is assumed throughout this system. Therefore, restoration of the exponent-mantissa format is accomplished by shifting register 38 up, leaving the most significant bit, the sign bit, unchanged the meanwhile, until the next two most significant digits disagree, which event is recognized by gate 52. This recognition inhibits gate 54, terminating the reformatting process.

The number of clock pulses required to accomplish this are counted in counter 62, and the consequence of that count is the output exponent. As many digits as are required may be taken off of the top of the register 38 to constitute the output mantissa, to be read in sign and mantissa read-out 58.

In FIG. 3, two RAM's, 24 and 64 are used. They "time-share" the roles of write-read. Their roles are periodically interchanged, so that while one is working in the write mode in time frame 1, (FIG. 1), the other is occupied in the read mode in time frame 3 (FIG. 2).

Obviously, many modifications and variations of the present invention are possible in the light of the above teachings. It is therefore to be understood that within the scope of the appended claims the invention may be practiced otherwise than as specifically described.

What is claimed is:

1. Apparatus for computing an arithmetically accumulated sequence of exponent-mantissa formatted numbers, comprising write-in apparatus and readout apparatus, the write-in apparatus comprising:

means for separating each of a sequence of binary numbers in exponent-mantissa form according to the values of the exponent, the value of the exponent being employed as a storing address for the number;

means connected to the separating means for algebraically summing mantissas of like exponents, the two above means comprising a write logic block;

first means connected to the summing means for storing the sum of the mantissas;

means for connecting the mantissa storing means and the summing means, which enables writing the last stored quantity back into the summing means, so that it may be summed algebraically to the latest incoming mantissa of like exponent from the sequence of numbers, the new sum then being written back into the storing means having the same, like, exponent address; and means, connected to the separating means, for addressing the storing means.

2. The apparatus according to claim 1 wherein:

the storing means and the addressing means comprise a random-access memory RAM.

3. Apparatus for computing an arithmetically accumulated sequence of exponent-mantissa formatted numbers, according to claim 2, said read-out apparatus comprising:

a second summing means, connected to the random-access memory, which, starting with the least significant data in the RAM, reads out the data in the RAM;

an address counter, connected to the random-access memory, which sequentially steps the read addresses;

an accumulator register, connected to the second summing means, which accumulates the least significant data, and writes it back into the summing means, where it is accumulated with the next least significant data, the reading out and writing in, that is, the accumulating, continuing until all the data in the random-access memory is read out, the combination of second summing means, address counter, and accumulator register comprising a read logic block.

4. The computing apparatus according to claim 3, further comprising:

an output register, connected to the accumulator register, of the read logic block, which reads out the totally accumulated data in the accumulator register, the data now being formatted as a pure magnitude in binary form without an explicit exponent.

5. The computing apparatus according to claim 4 further comprising apparatus for reconstituting the data formatted as a pure magnitude in binary form, which comprises:

an output register, connected to the accumulator register of the read logic block, whose contents are shifted up, leaving the significant bit unchanged, until the two next most significant digits disagree;

an exclusive-or gate, connected to the output of the output register, which determines when the two most significant digits disagree;

an inhibit gate, having as inputs a clock input and the output of the exclusive-or gate, which inhibit gate is inhibited by the exclusive-or gate when the two most significant digits disagree, thereby terminating the reformatting process, the most significant bits in the output register designating the sign and mantissa of the accumulated data the exponent counter designating the exponent of the accumulated data.

6. The computing apparatus according to claim 3, further comprising:

another random-access memory, substantially identical to the first-named memory;

a first switching means, connected to the write logic block, which transfers data selectively from the write logic block to the first-and-second named random-access memory:

a second switching means, connected to the read logic block and selectively to the second-named and first-named random-access memory, so that as data is written into one random-access memory from the write logic block it may be read out of the other random-access memory by the read logic block.

* * * * *